United States Patent
Haruyama (10) Patent No.: US 7,570,328 B2
(45) Date of Patent: Aug. 4, 2009

(54) LIQUID CRYSTAL DEVICE AND PROJECTION DISPLAY DEVICE

(75) Inventor: Akihide Haruyama, Nagano (JP)

(73) Assignee: Seiko Epson Corporation (JP)

( * ) Notice: Subject to any disclaimer, the term of this patent is extended or adjusted under 35 U.S.C. 154(b) by 540 days.

(21) Appl. No.: 11/211,019

(22) Filed: Aug. 24, 2005

(65) Prior Publication Data

US 2006/0050215 A1 Mar. 9, 2006

(30) Foreign Application Priority Data

Sep. 8, 2004 (JP) ............................. 2004-260753

(51) Int. Cl.
*G02F 1/1335* (2006.01)
(52) U.S. Cl. ...................................... 349/117
(58) Field of Classification Search ............... None
See application file for complete search history.

(56) References Cited

U.S. PATENT DOCUMENTS

| | | | |
|---|---|---|---|
| 4,889,412 A | 12/1989 | Clerc et al. | |
| 5,506,706 A | 4/1996 | Yamahara et al. | |
| 6,556,266 B1 | 4/2003 | Shirochi et al. | |
| 6,902,277 B1 * | 6/2005 | Ehrne ......................... | 353/119 |
| 2004/0032546 A1 | 2/2004 | Ito | |

FOREIGN PATENT DOCUMENTS

| | | |
|---|---|---|
| EP | 1341007 | 3/2003 |
| JP | 03-215831 | 9/1991 |
| JP | 07-69536 | 7/1995 |
| JP | 2001-042314 | 2/2001 |
| JP | 2005-172984 | 6/2005 |
| JP | 2006-011298 | 1/2006 |
| WO | WO2006/001188 A1 | 1/2006 |

OTHER PUBLICATIONS

Communication from Japanese Patent Office regarding application.

* cited by examiner

*Primary Examiner*—Timothy Rude
(74) *Attorney, Agent, or Firm*—Harness, Dickey & Pierce, P.L.C.

(57) ABSTRACT

A liquid crystal device includes a pair of substrates; a liquid crystal layer interposed between the pair of substrates, the liquid crystal layer being composed of liquid crystal having negative dielectric anisotropy in which an initial alignment state thereof is vertical; and an optical compensating plate which is provided outside at least one substrate of the pair of substrates and has negative refractive index anisotropy. The liquid crystal is pretilted in a predetermined direction, and an optical axis direction of the optical compensating plate is substantially parallel to the pretilt direction of the liquid crystal.

3 Claims, 10 Drawing Sheets

LIQUID CRYSTAL DEVICE AND PROJECTION DISPLAY DEVICE

RELATED APPLICATIONS

This application claims priority to Japanese Patent Application No. 2004-260753 filed Sep. 8, 2004 which is hereby expressly incorporated by reference herein in its entirety.

BACKGROUND OF THE INVENTION

1. Technical Field

The present invention relates to a liquid crystal device and to a projection display device.

2. Related Art

In recent years, liquid crystal projectors (projection display devices) have been used as display devices in which large-screen display can be performed. In such a projector, a structure has been suggested in which a liquid crystal device, which is driven in a 'VA (Vertical Alignment) mode' where liquid crystal having negative dielectric anisotropy is vertically aligned on a substrate and liquid crystal molecules are tilted by applying a voltage, is included as a light valve. However, since most liquid crystal projectors in the related art have a contrast ratio of substantially 1:500 in a projected image, they are not as good as projectors, such as DMDs (registered trademark) using mechanical shutters, which have a contrast ratio of 1:3000. That is because of the viewing angle characteristics of the liquid crystal device. In the liquid crystal projector, light incident on the liquid crystal device is not entirely parallel light. However, since the liquid crystal device has incident angle dependence, it causes the contrast ratio of the projected image to decrease. To overcome this problem, Japanese Unexamined Patent Application Publication No. 7-69536 discloses a technology in which an optical compensating plate is employed to compensate for the incident angle dependency of the liquid crystal device, thereby realizing a display having a higher contrast.

In the technology disclosed in Japanese Unexamined Patent Application Publication No. 7-69536, a refractive index anisotropic body serving as the optical compensating plate is arranged in a vertical-alignment-type liquid crystal cell, so that it is possible to compensate for a phase difference occurring in the liquid crystal cell due to inclined light. However, when the liquid crystal is pretilted to control the alignment of liquid crystal molecules, the effect of the optical compensating plate decreases as the pretilt angle decreases from 90°.

SUMMARY

An advantage of the invention is that it provides a projection display device which is capable of performing excellent optical compensation even when the liquid crystal is pretilted, and of performing image display having a high contrast by including a liquid crystal device of the invention.

According to an aspect of the invention, a liquid crystal device includes a pair of substrates; a liquid crystal layer interposed between the pair of substrates, the liquid crystal layer being composed of liquid crystal having negative dielectric anisotropy representing that an initial alignment state thereof is vertical; and an optical compensating plate which is provided outside at least one substrate of the pair of substrates and has negative refractive index anisotropy. The liquid crystal is pretilted in a predetermined direction, and an optical axis direction of the optical compensating plate is substantially parallel to the pretilt direction of the liquid crystal. In the above-mentioned liquid crystal device, it is preferable that the optical compensating plate be disposed parallel to one substrate, and the optical axis direction of the optical compensating plate be substantially parallel to the pretilt direction of the liquid crystal, at an angle deviating from the normal line of the optical compensating plate. Further, preferably, the optical axis direction of the optical compensating plate is substantially parallel to the normal line direction of the optical compensating plate, and the optical compensating plate be disposed to be inclined from a location parallel to one of the pair of substrates such that the optical axis direction of the optical compensating plate is substantially parallel to the pretilt direction of the liquid crystal.

In this case, the optical axis direction of the optical compensating plate is inclined according to the pretilt of the liquid crystal, so that it is possible to entirely compensate for a phase difference due to the pretilt of the liquid crystal and a phase difference due to the light in a inclined direction.

According to another aspect of the invention, there is provided a projection display device including the above-mentioned liquid crystal device as an optical modulating unit.

In this case, light leakage in black display can be prevented, and a high contrast ratio in a projected image can be obtained.

Further, preferably, the projection display device further includes an adjuster that adjusts an arrangement angle of the optical compensating plate such that the optical axis direction of the optical compensating plate aligns with the pretilt direction of the liquid crystal. Furthermore, it is preferable that the adjuster be composed of a rotation mechanism for rotating the optical compensating plate on two axes.

According to this aspect, since the optical axis direction of the optical compensating plate can be freely adjusted by the adjusting mechanism, it is possible to cope with the design change such as the change of the pretilt angle of the liquid crystal without requiring the design change of the optical compensating plate.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, embodiments of the invention will be described with reference to the accompanying drawings. The scale of each member has been adjusted in order to have a recognizable size in the drawings described below. In the present specification, one side of each constituent element of a liquid crystal device toward a liquid crystal layer is called an inner side, and the other side of the liquid crystal device is called an outer side.

First Embodiment

First, a liquid crystal device according to a first embodiment of the invention will be described with reference to FIGS. 1 to 6. The liquid crystal device according to the first embodiment includes a liquid crystal panel with a liquid crystal layer interposed between a pair of substrates, an optical compensating plate disposed outside one substrate of the liquid crystal panel, and polarizers disposed outside the optical compensating plate and the other substrate of the liquid crystal panel, respectively. In the present embodiment, an active-matrix-type transmissive liquid crystal panel, which uses a thin film transistor (hereinafter, referred to as a TFT) element serving as a switching element, will be described by way of an example.

Equivalent Circuit

Figure 1:
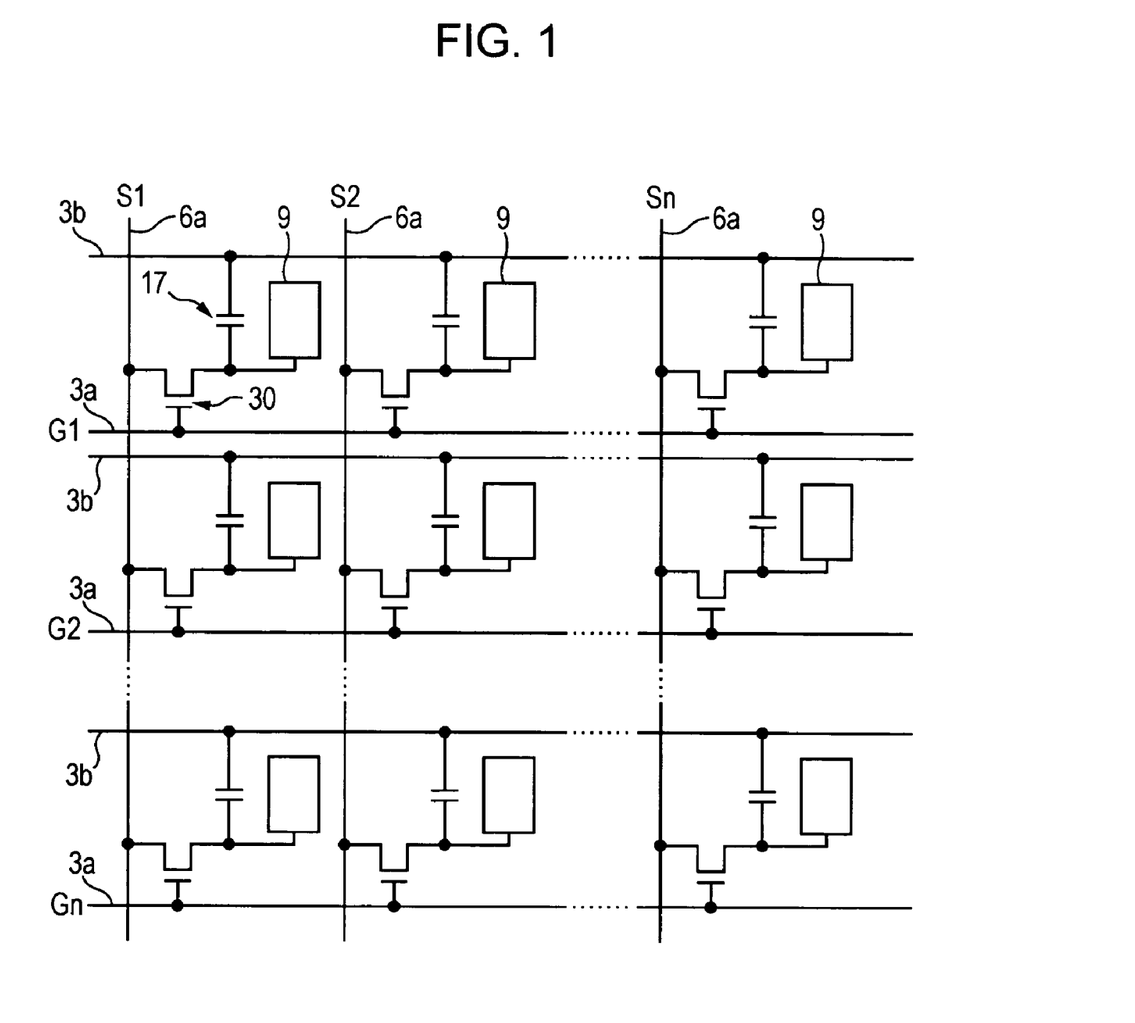
FIG. 1 is an equivalent circuit diagram of a liquid crystal panel.

FIG. 1 is an equivalent circuit diagram of the liquid crystal panel. A plurality of dots arranged in a matrix which constitute an image display region of the transmissive liquid crystal panel are provided with pixel electrodes 9, respectively. A TFT element 30, which serves as a switching element to electrically control the pixel electrode 9, is provided at one side of the pixel electrode 9. The TFT element 30 has a source electrode electrically connected to a data line 6a. The respective data lines 6a are supplied with image signals S1, S2, ..., and Sn. The image signals S1, S2, ..., and Sn may be line-sequentially supplied to the respective data lines 6a in this order, or may be supplied to the plurality of adjacent data lines 6a constituting each group.

In addition, the TFT element 30 has a gate electrode electrically connected to a scanning line 3a. The respective scanning lines 3a are supplied with scanning signals G1, G2, ..., and Gm with a predetermined timing in a pulsed manner. Further, the scanning signals G1, G2, ..., and Gm are line-sequentially applied to the respective scanning lines 3a in this order. Furthermore, the TFT element 30 has a drain electrode electrically connected to the pixel electrode 9. In addition, when the TFT elements 30 each serving as the switching element are turned on during a predetermined period by the scanning signals G1, G2, ..., and Gm supplied through the scanning lines 3a, the image signals S1, S2, ..., and Sn, which are supplied through the data lines 6a, are written into liquid crystal of the respective pixels with a predetermined timing.

The image signals S1, S2, ..., and Sn, which are written into the liquid crystal and having predetermined levels, are held for a predetermined period by a liquid crystal capacitor formed between the pixel electrode 9 and a common electrode, which will be described below. In addition, in order to prevent the held image signals S1, S2, ..., and Sn from leaking, a storage capacitor 17 is formed between the pixel electrode 9 and a capacitive line 3b, and is disposed parallel to the liquid crystal capacitor. As such, when a voltage signal is applied to the liquid crystal, alignment states of liquid crystal molecules change according to the applied voltage level. As a result, light incident on the liquid crystal is modulated, and thus gray-scale display can be achieved.

Planar Structure

Figure 2:
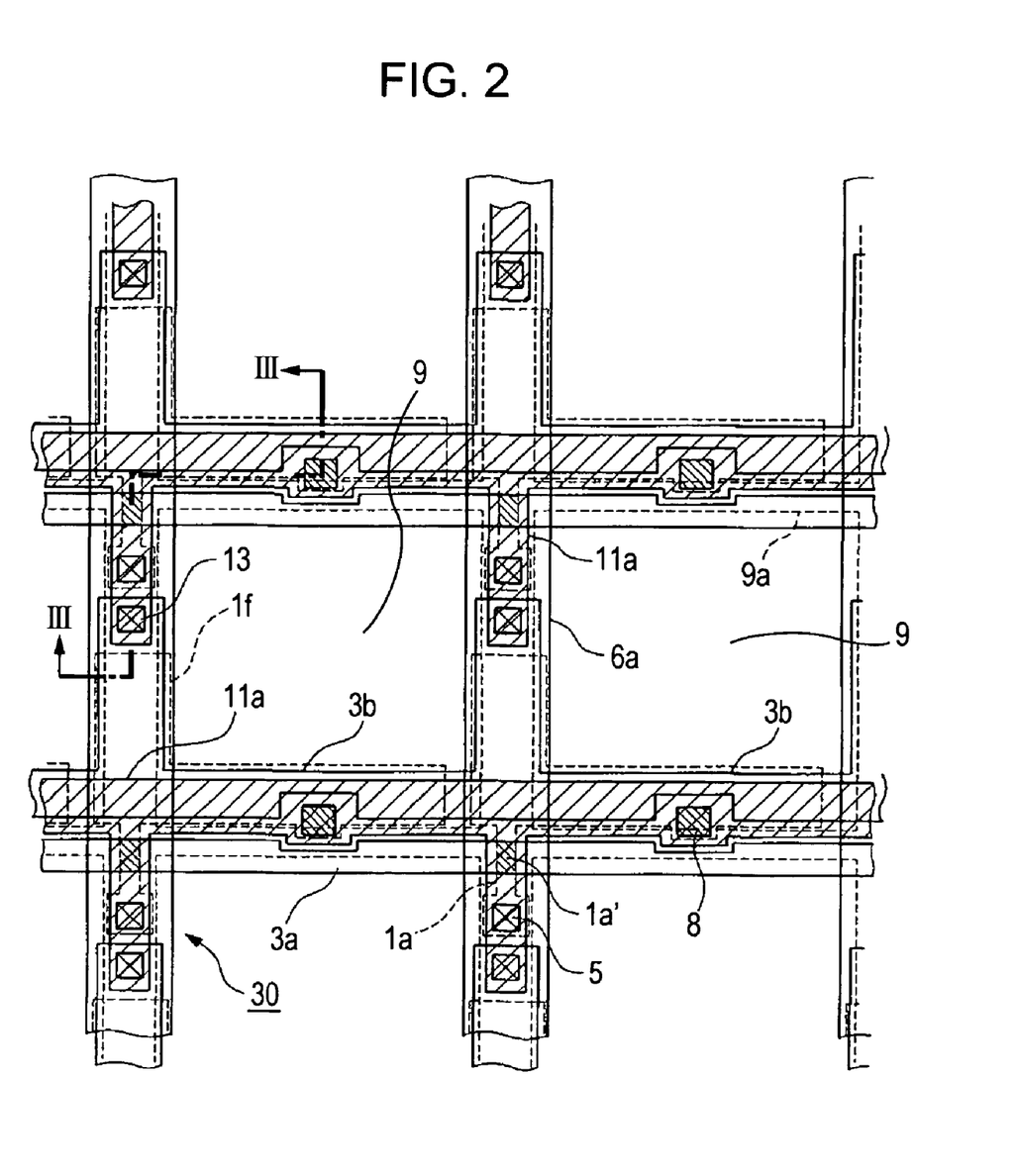
FIG. 2 is a diagram showing the planar structure of the liquid crystal panel.

FIG. 2 is a diagram illustrating the planar structure of the liquid crystal panel. In the liquid crystal panel according to the present embodiment, on the TFT array substrate, the rectangular pixel electrodes 9 (their outlines are shown by broken lines), which are made of transparent conductive materials, such as indium tin oxide (hereinafter, referred to as ITO), are arranged in a matrix. In addition, the data line 6a, the scanning line 3a and the capacitive line 3b are provided along longitudinal and horizontal boundaries of the pixel electrode 9. According to the present embodiment, a region where the pixel electrode 9 is formed is a dot, and display can be performed by each dot arranged in a matrix.

The TFT element 30 is formed around a semiconductor layer 1a made of a polysilicon film. The semiconductor layer 1a has a source region (which will be described below) electrically connected to the data line 6a via a contact hole 5. The semiconductor layer 1a has a drain region (which will be described below) electrically connected to the pixel electrode 9 via a contact hole 8. On the other hand, a portion of the semiconductor layer 1a opposite to the scanning line 3a is provided with a channel region 1a'. In addition, the scanning line 3a has a portion opposite to the channel region 1a', serving as a gate electrode.

The capacitive line 3b has a main line portion linearly extending along the scanning line 3a (that is, a first region formed along the scanning line 3a in plan view) and a protruding portion protruding toward a front stage side (upward in the drawing) along the data line 6a from an intersection of the data line 6a and the capacitive line 3b (that is, a second region extending along the data line 6a in plan view). Further, in regions shown by an inclined line rising toward a right side in FIG. 2, first light shielding films 11a are formed. In addition, the protruding portion of the capacitive line 3b and the first light shielding film 11a are electrically connected to each other through a contact hole 13, thereby forming a storage capacitor, which will be described below.

Sectional Structure

Figure 3:
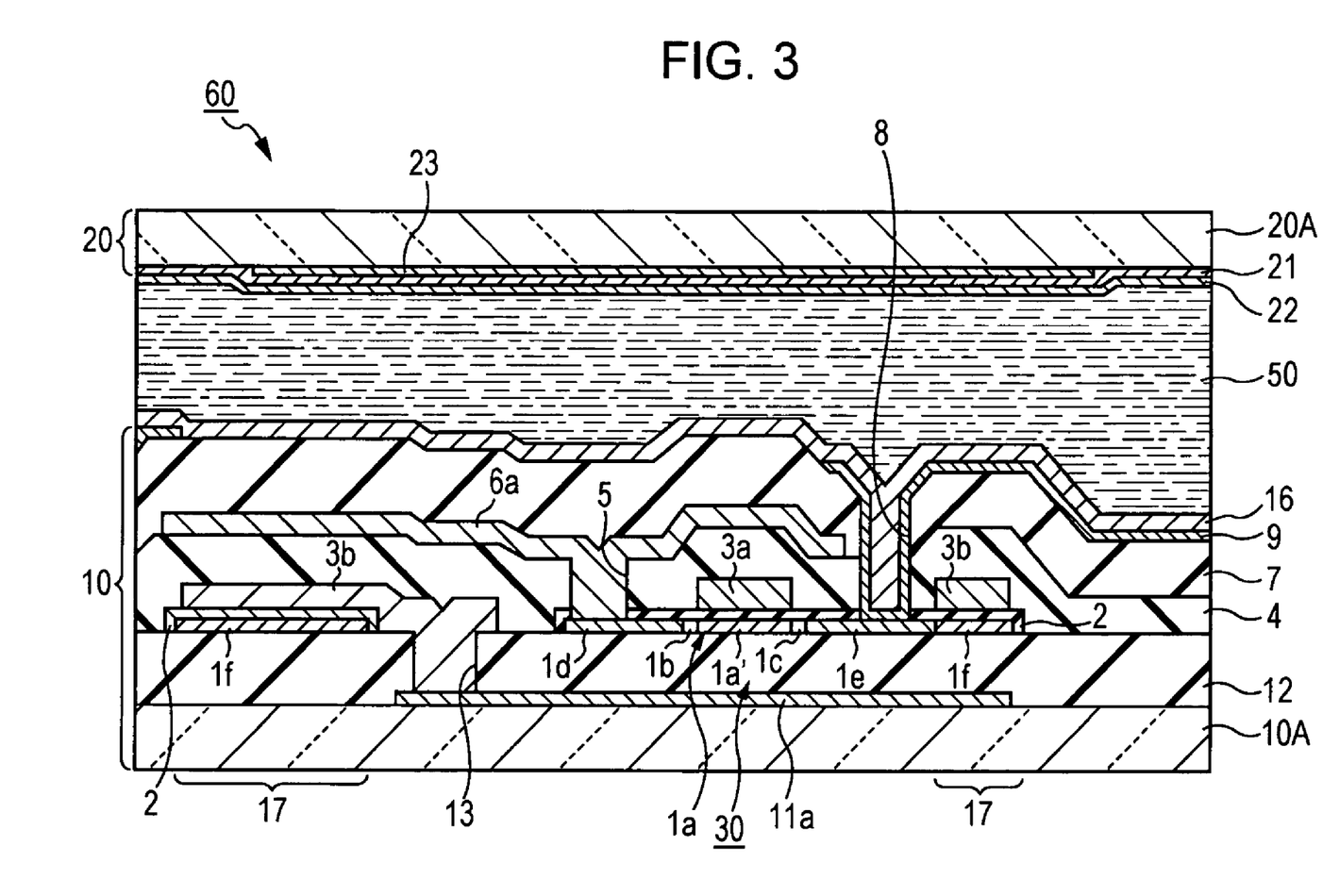
FIG. 3 is a cross-sectional view taken along the line III-III of FIG. 2.

FIG. 3 is a diagram illustrating the sectional structure of the liquid crystal panel, which is a cross-sectional view taken along the line III-III of FIG. 2. As shown in FIG. 3, the liquid crystal panel 60 according to the present embodiment mainly includes the TFT array substrate 10, a counter substrate 20 arranged opposite to the TFT array substrate 10, and a liquid crystal layer 50 interposed between the TFT array substrate 10 and the counter substrate 20. The TFT array substrate 10 mainly includes a substrate body 10A made of a transmissive material, such as glass or quartz, and TFT elements 30, the pixel electrodes 9, an alignment film 16 or the like formed in the substrate. In addition, the counter substrate 20 mainly includes a substrate body 20A made of a transmissive material, such as glass or quartz, and common electrodes 21, an alignment film 22 or the like formed in the substrate.

On a surface of the TFT array substrate 10, a first light shielding film 11a and a first interlayer insulating film 12, which will be described in detail below, are formed. In addition, the semiconductor layer 1a is formed on a surface of the first interlayer insulating film 12, and the TFT element 30 is formed around the semiconductor layer 1a. A channel region $1a'$ is formed at a portion of the semiconductor layer $1a$ opposite to the scanning line $3a$, and the source region and the drain region are formed at both sides of the channel region. In addition, since the TFT element 30 has the LDD (lightly doped drain) structure, each of the source and drain regions has a heavily doped region having a relatively high impurity concentration and a lightly doped region (LDD region) having a relatively low impurity concentration. That is, in the source region, a lightly doped source region $1b$ and a heavily doped source region $1d$ are formed, and in the drain region, a lightly doped drain region $1c$ and a heavily doped drain region $1e$ are formed.

On a surface of the semiconductor layer $1a$, a gate insulating film 2 is formed. In addition, on a surface of the gate insulating film 2, the scanning line $3a$ is formed, and a portion of the scanning line $3a$ constitutes a gate electrode. In addition, a second interlayer insulating film 4 is formed on surfaces of the gate insulating film 2 and the scanning line $3a$. Further, the data line $6a$ is formed on the surface of the second interlayer insulating film 4 and is electrically connected to the heavily doped source region $1d$ through the contact hole 5 formed in the second interlayer insulating film 4. In addition, a third interlayer insulating film 7 is formed on the surfaces of the second interlayer insulating film 4 and the data line $6a$. In addition, the pixel electrode 9 is formed on a surface of the third interlayer insulating film 7 and is electrically connected to the heavily doped drain region 1e through a contact hole 8 formed in the second interlayer insulating film 4 and the third interlayer insulating film 7. In addition, an inorganic vertical alignment film 16 composed of an oblique vapor deposition film is formed in order to cover the pixel electrode 9.

In addition, according to the present embodiment, the semiconductor layer $1a$ is extended to form a first storage capacitor electrode $1f$. Further, the gate insulating film $2a$ is extended to form a dielectric film, and a capacitive line $3b$ is disposed on a surface of the dielectric film to form a second storage capacitor electrode. As a result, the above-mentioned storage capacitor 17 is constructed.

In addition, the first light shielding film $11a$ is formed on the surface of the TFT array substrate 10 corresponding to regions where the TFT elements 30 are formed. The first light shielding film $11a$ serves to prevent the light incident on the liquid crystal panel from leaking into the channel region $1a'$ of the semiconductor layer $1a$, the lightly doped source region $1b$ and the lightly doped drain region $1c$. In addition, the first light shielding film $11a$ is electrically connected to the capacitive line $3b$ located at a front or rear stage through the contact hole 13 formed in the first interlayer insulating film 12. As a result, the first light shielding film $11a$ functions as a third storage capacitor electrode, and a new storage capacitor is formed between the first light shielding film $11a$ and the first storage capacitor electrode $1f$ using the first interlayer insulating film 12 as the dielectric film.

On the other hand, a second light shielding film 23 is formed on a surface of the counter substrate 20 corresponding to regions where the data line $6a$, the scanning line $3a$, and the TFT element 30 are formed. The second light shielding film 23 serves to prevent the light incident on the liquid crystal panel from leaking into the channel region $1a'$ of the semiconductor layer $1a$, the lightly doped source region $1b$, and the lightly doped drain region $1c$. In addition, the common electrode 21, which is made of a conductive material, such as ITO, is formed on substantially the entire surfaces of the counter substrate 20 and the second light shielding film 23. Further, an inorganic vertical alignment film 22 composed of an oblique vapor deposition film is formed on a surface of the common electrode 21. In addition, by means of these alignment films 22 and 16, liquid crystal molecules are aligned to be inclined in a predetermined direction from a horizontal plane of the substrate in a state in which a voltage is not applied to the liquid crystal. According to the present embodiment, vapor deposition angles of the alignment films 16 and 22 are set to about 50° with respect to the normal line of the substrate and thicknesses thereof are set to 40 nm. As a result, the liquid crystal molecules are aligned in a state in which they are inclined at an angle of about 86° in a predetermined direction from the horizontal plane of the substrate (4° with respect to the normal line of the substrate). Hereinafter, the inclined direction of the liquid crystal molecules (that is, the director of the liquid crystal molecules when a voltage is not applied) is referred to as a pretilt direction of the liquid crystal.

In addition, the liquid crystal layer 50 is interposed between the TFT array substrate 10 and the counter substrate 20. The liquid crystal layer 50 is composed of nematic liquid crystal showing negative dielectric anisotropy. That is, the liquid crystal molecules constituting the liquid crystal layer 50 are vertically aligned when an electrical field is not applied (an initial alignment state) and are horizontally aligned when the electrical field is applied.

Polarizer

Figure 4:
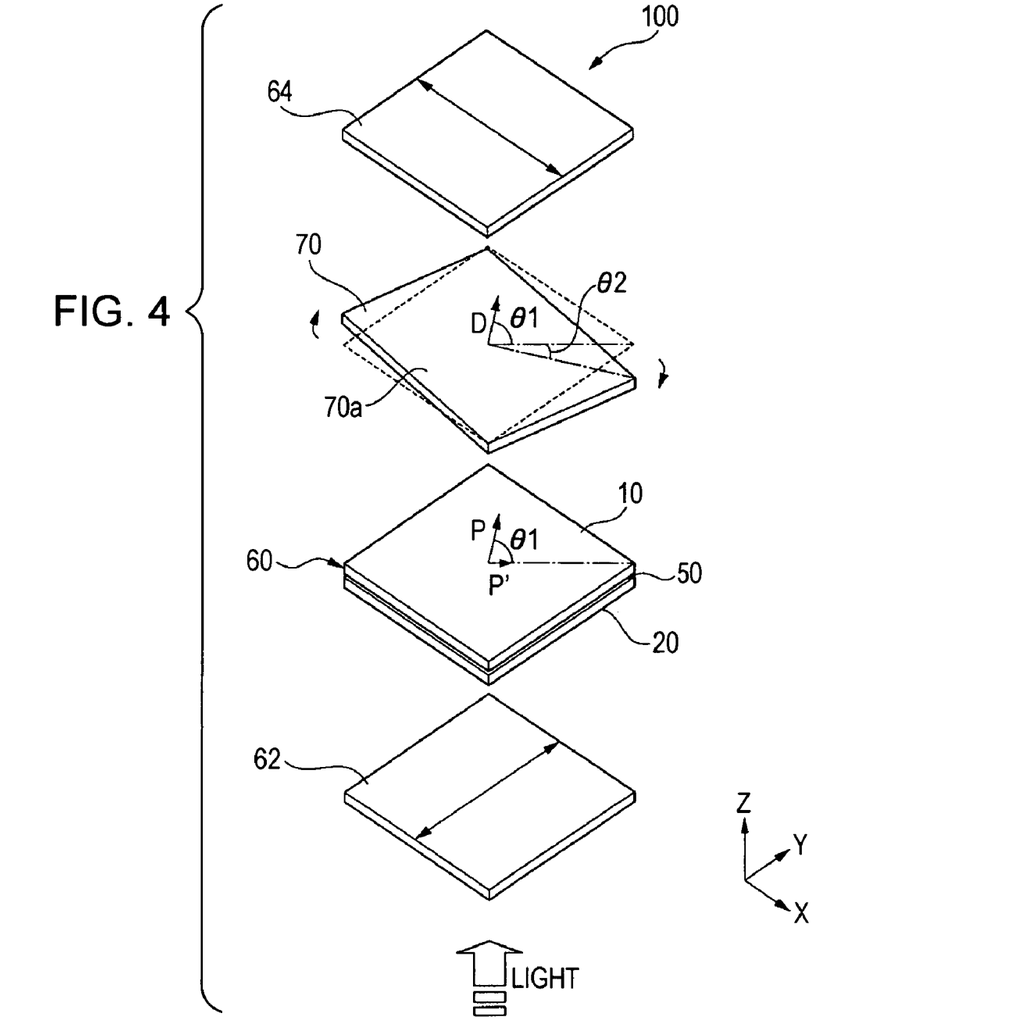
FIG. 4 is an exploded perspective view of a liquid crystal device according to a first embodiment of the invention.

FIG. 4 is an exploded perspective view of the liquid crystal device according to the present embodiment.

The liquid crystal device 100 according to the present embodiment includes the above-mentioned liquid crystal panel 60, an optical compensating plate 70 disposed outside the TFT array substrate 10 of the liquid crystal panel 60, and polarizers 62 and 64 disposed outside the optical compensating plate 70 and the counter substrate 20, respectively. The polarizer 62 is disposed at one side of the liquid crystal panel 60 where light is incident and the polarizer 64 is disposed at the other side of the liquid crystal panel 60 where the light is emitted. In the polarizer 62 disposed at one side of the liquid crystal panel where light is incident, its transmission axis is parallel to a Y direction of FIG. 4. In addition, in the polarizer 64 disposed at the other side of the liquid crystal panel where light is emitted, its transmission axis is parallel to an X direction of FIG. 4. The directions of the transmission axes of these polarizers 62 and 64 are inclined with respect to a direction P' of a projection vector obtained by reflecting the pretilt direction P of the above-mentioned liquid crystal on the substrate plane.

Further, when the light is incident on the liquid crystal device 100 from the lower side of the polarizer 62, only linearly polarized light aligned with the transmission axis of the polarizer 62 is transmitted through the polarizer 62. In the liquid crystal panel 60 when the electrical field is not applied, the liquid crystal molecules are vertically aligned in a state in which they are pretilted in one direction with respect to the substrate plane. Therefore, the polarization state of the linearly polarized light incident on the liquid crystal panel 60 is changed due to a phase difference according to the pretilt, and the light is then emitted from the liquid crystal panel 60 as elliptically polarized light. In addition, since the elliptically polarized light is almost orthogonal to the transmission axis of the polarizer 64, it is almost impossible to transmit it through the polarizer 64. Therefore, in the liquid crystal panel 60, when the electrical field is applied, black display is performed (normally black mode). On the other hand, in the liquid crystal panel 60, when the electrical field is applied, the liquid crystal molecules are vertically aligned. For this reason, the polarization direction of the linearly polarized light incident on the liquid crystal panel 60 is changed in a direction orthogonal to the incident light due to birefringence. Since the polarization axis of the linearly polarized light aligns with the transmission axis of the polarizer 64, it is transmitted through the polarizer 64. Therefore, in the liquid crystal panel 60, when the electrical field is not applied, white display is performed.

Optical Compensating Plate

In the present embodiment, the optical compensating plate 70 is disposed between the polarizer 62 and the substrate 20 of the liquid crystal panel 60 where the light is emitted.

Figure 5:
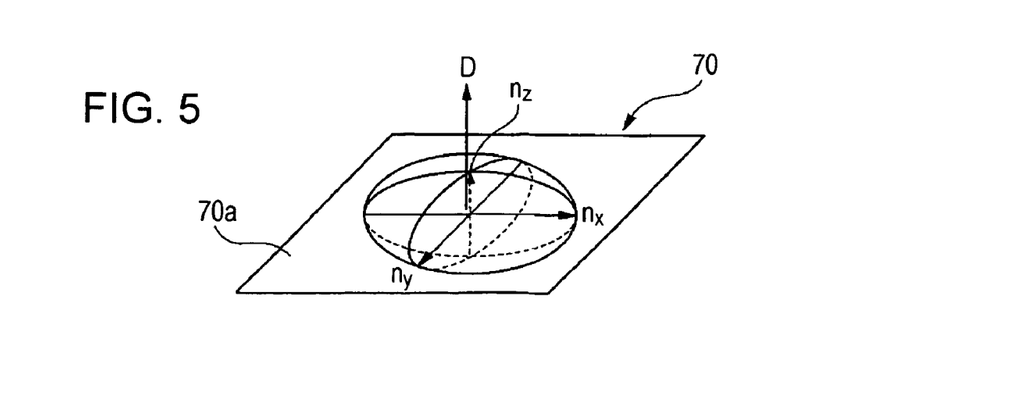
FIG. 5 is a diagram showing an index ellipsoid of an optical compensating plate.

FIG. 5 is a schematic diagram showing an index ellipsoid of the optical compensating plate 70. In FIG. 5, $n_x$ and $n_y$ indicate principal refractive indices in a plane direction of the optical compensating plate, and $n_z$ indicates a principal refractive index in a depthwise direction of the optical compensating plate. The optical compensating plate 70 according to the present embodiment is composed of an optically anisotropic body, such as a discotic compound, having negative refractive index anisotropy, and the principal refractive indices $n_x$, $n_y$, and $n_z$ satisfy the condition $n_x=n_y>n_z$. That is, the refractive index $n_z$ in an optical axis direction D is smaller than those of refractive indices in the other directions, and forms a disc shape in the index ellipsoid. The index ellipsoid is aligned parallel to the horizontal plane 70a of the optical compensating plate 70, and the optical-axis direction D of the optical compensating plate 70 (a minor-axis direction of the index ellipsoid) is parallel to the normal direction of the optical compensating plate 70. In the present embodiment, a thickness-direction phase difference of the optical compensating plate 70 $((n_x-n_z) \cdot d$, where d is the thickness of the optical compensating plate) is 0.2 μm, and the retardation of the liquid crystal panel 60 is 0.32. Therefore, the thickness-direction phase difference of the optical compensating plate 70 is set to be slightly smaller than the retardation of the liquid crystal panel 60.

The above-mentioned optical compensating plate 70 is mounted on a supporting substrate. The supporting substrate is made of a transmissive material, such as non-alkali glass, or sapphire or quartz having high thermal conductivity. In addition, the optical compensating plate 70 mounted on the supporting substrate is disposed in the liquid crystal device 100 at a predetermined distance from the surface of the liquid crystal panel 60 shown in FIG. 4. As a result, it is possible to prevent the optical compensating plate 70 from deteriorating due to the heat irradiated from the liquid crystal panel 60. In addition, the optical compensating plate 70 is disposed so as to be inclined at an angle of θ2 with respect to a substrate plane of the liquid crystal panel 60, such that its optical axis direction D is substantially parallel to the pretilt direction P of the liquid crystal panel 60. According to the present embodiment, since the pretilt angle θ1 of the liquid crystal molecules is set to 86° with respect to the horizontal plane of the substrate 10 (4° with respect to the normal line of the substrate), a plate face 70a of the optical compensating plate 70 is disposed in a state in which it is rotated at an angle of 4° from a position parallel to the substrate 10. The inclined angle θ2 of the optical compensating plate 70 can be adjusted by means of a predetermined rotating mechanism (adjuster) to rotate the optical compensating plate 70 or the supporting substrate for supporting the optical compensating plate 70. As such, by providing the adjuster to adjust a disposition angle of the optical compensating plate 70, it is possible to easily cope with design changes of the liquid crystal panel 60. Preferably, such a rotating mechanism can rotate the optical compensating plate 70 about two axes.

Figure 6:
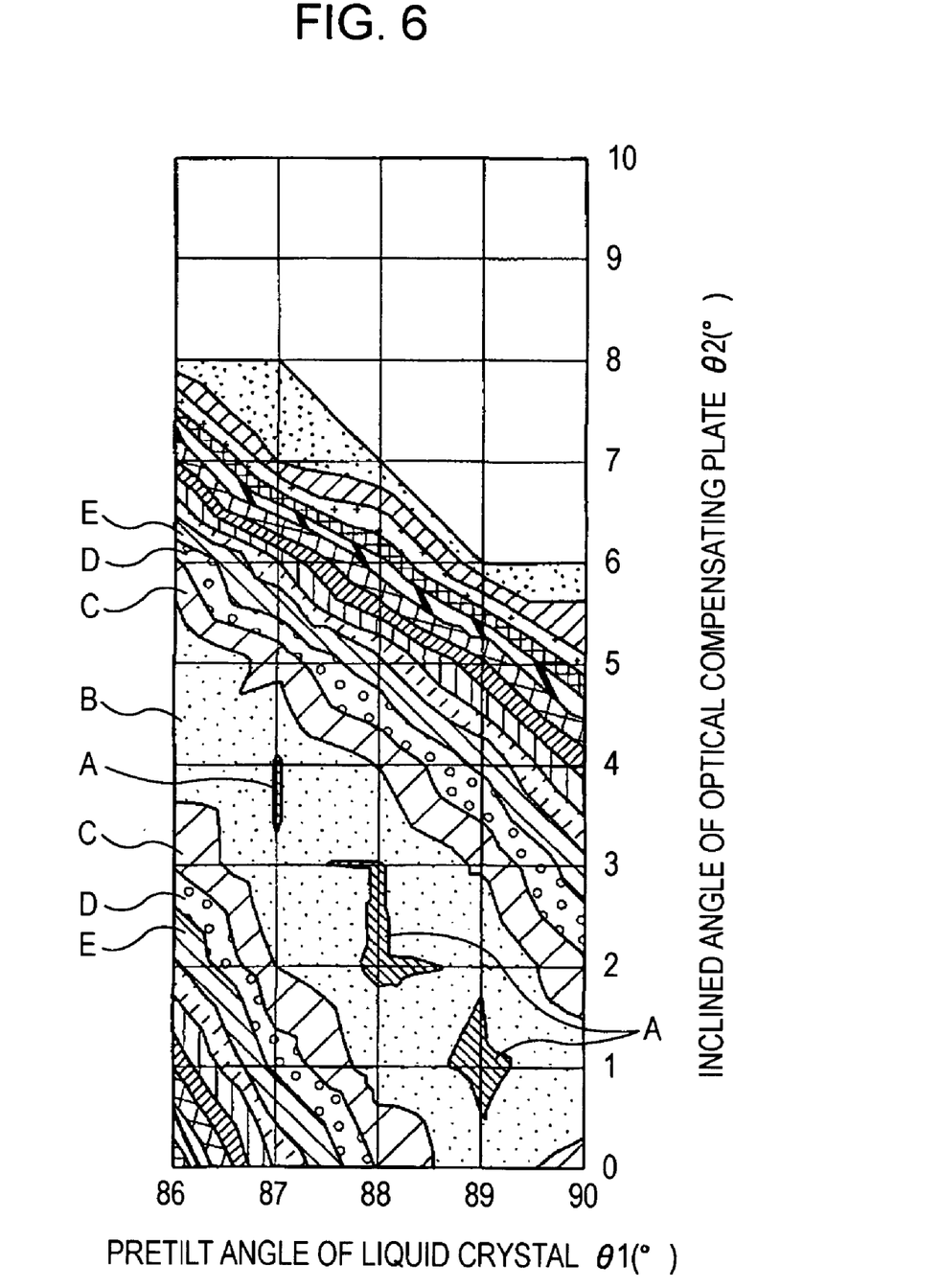
FIG. 6 is a graph showing black transmittance when changing an inclined angle of the optical compensating plate and a pretilt angle of liquid crystal.

FIG. 6 is a graph showing the transmittance at the time of performing black display in the case of changing the pretilt angle θ1 of the liquid crystal and the inclined angle θ2 of the optical compensating plate 70. Specifically, FIG. 6 shows the transmittance at the time of performing black display in the case in which a lamp light source has an intensity distribution in a cone of substantially 10°. In FIG. 6, a region shown by a sign A has the lowest transmittance, and regions shown by signs B, C, D, . . . have transmittances increasing in this order. As shown in FIG. 6, the transmittance at the time of performing the black display becomes lowest when the optical axis direction D of the optical compensating plate 70 is substantially parallel to the pretilt direction P of the liquid crystal, and the transmittance increases as it deviates from the condition. For this reason, it can be apprehended that high contrast display, in which bright black display is suppressed by aligning the optical axis direction D with the pretilt direction P, can be achieved.

As described above, according to the present embodiment, the optical compensating plate 70 is disposed to be inclined with respect to the liquid crystal panel 60 (that is, not parallel to each other), such that the pretilt direction P of liquid crystal aligns with the optical axis direction of the optical compensating plate 70. For this reason, it is possible to entirely compensate for the phase difference due to the pretilt of the liquid crystal and the phase difference due to the light in an oblique direction, so that high contrast display can be achieved as compared to the related art.

Further, in the present embodiment, the number of optical compensating plates 70 is one, but two or more may be provided. For example, the optical compensating plate 70 may be composed of a plurality of optical compensating plates, and a new optical compensating plate may be provided between the polarizer 62 and the counter substrate 20 of the liquid crystal panel 60. Also, the optical compensating plate 70 allows the slow axes of two positive refractive index anisotropic bodies to be orthogonal to each other, so that it may be provided as a negative refractive index anisotropic body.

Second Embodiment

Next, a liquid crystal device according to a second embodiment of the invention will be described with reference to FIGS. 7 to 9. The liquid crystal device according to the present embodiment has the same basic configuration as that of the first embodiment, except that an optical compensating plate is disposed parallel to a liquid crystal panel and only its optical axis is inclined from a horizontal plane. Therefore, in FIGS. 7 to 9, constituent elements common to FIGS. 1 to 6 are denoted by the same reference numerals, and the description thereof will be omitted.

Figure 7:
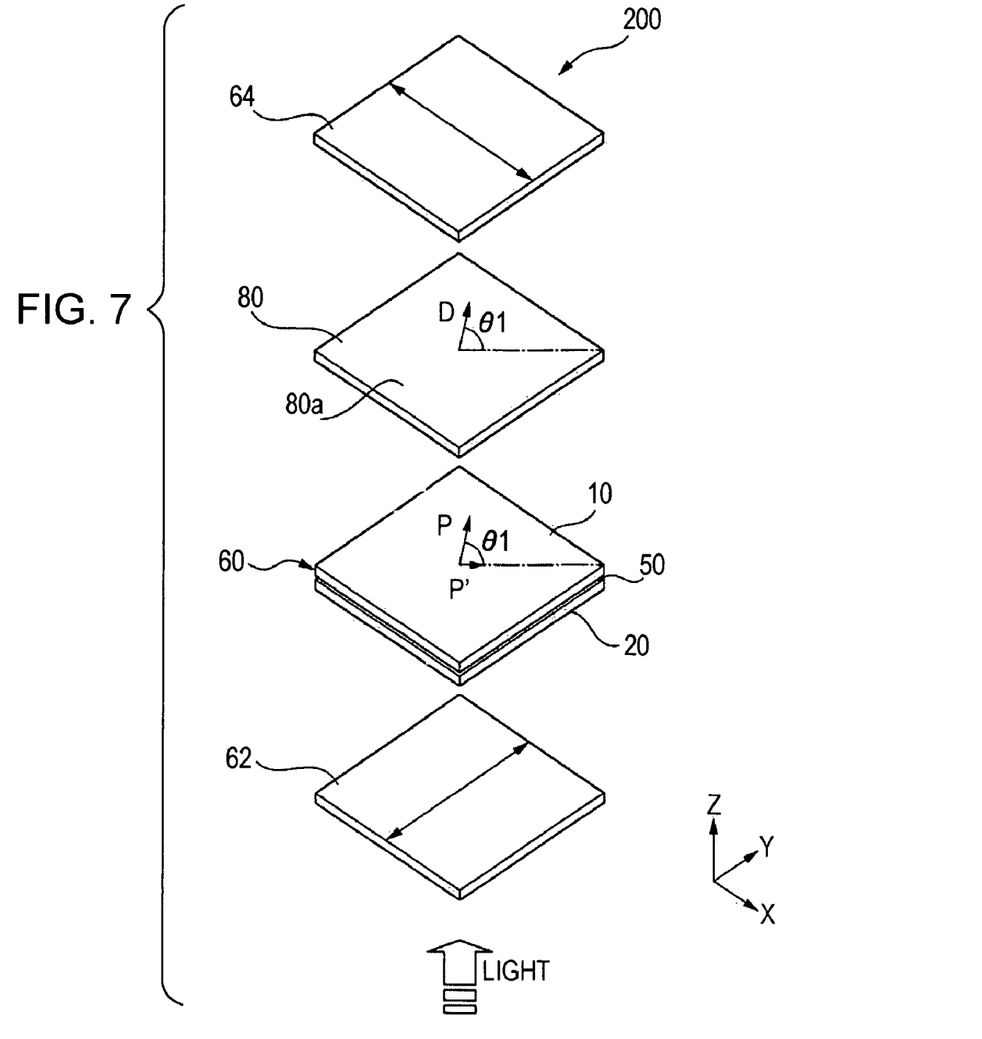
FIG. 7 is an exploded perspective view of a liquid crystal device according to a second embodiment of the invention.

FIG. 7 is an exploded perspective view of the liquid crystal device according to the second embodiment of the invention.

A liquid crystal device 200 according to the present embodiment includes a liquid crystal panel 60, an optical compensating plate 80 disposed outside a TFT array substrate 10 of the liquid crystal panel 60, and polarizers 62 and 64 disposed outside the optical compensating plate 80 and a counter substrate 20. In the present embodiment, the optical compensating plate 80 is disposed parallel to the substrate 10 of the liquid crystal panel 60.

Figure 8:
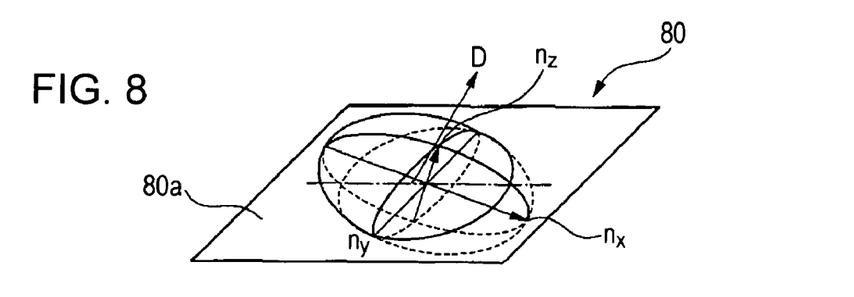
FIG. 8 is a diagram showing the index ellipsoid of the optical compensating plate.
Figure 9:
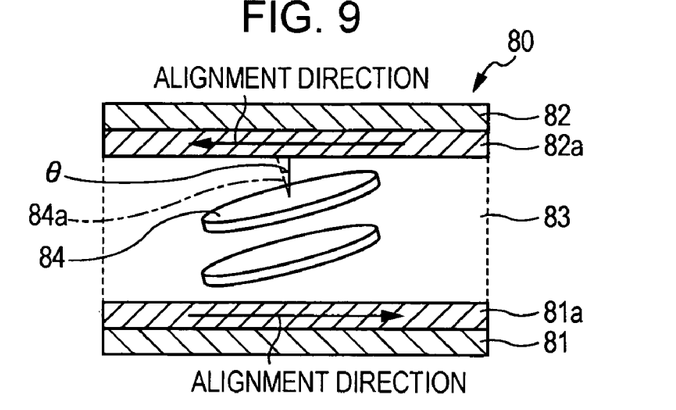
FIG. 9 is a cross-sectional view showing one structural example of the optical compensating plate.

FIG. 8 is a schematic diagram showing the index ellipsoid of the optical compensating plate 80. In FIG. 8, $n_x$ and $n_y$ indicate principal refractive indices in a plane direction of the optical compensating plate, and $n_z$ indicates a principal refractive index in a depthwise direction of the optical compensating plate. The optical compensating plate 80 according to the present embodiment is composed of an optically anisotropic body, such as a discotic compound, having negative refractive index anisotropy, and the principal refractive indices $n_x$, $n_y$, and $n_z$ satisfy the condition $n_x=n_y>n_z$. That is, the refractive index $n_z$ in an optical axis direction D is smaller than the refractive indices $n_x$ and $n_y$ in the other directions, and forms a disc shape in the index ellipsoid. The index ellipsoid is aligned so as to be inclined to the horizontal plane 80a of the optical compensating plate 80, and the optical-axis direction D of the optical compensating plate 80 (a minor-axis direction of the index ellipsoid) is inclined at an angle of θ1 with respect to the normal direction of the optical compensating plate 80. The inclined angle θ1 of the optical axis is substantially equal to a pretilt angle of the liquid crystal panel 60, so that the optical axis direction D of the optical compensating plate 80 is substantially parallel to the pretilt direction P of the liquid crystal. In the present embodiment, the pretilt angle θ1 of the liquid crystal is set to 88° with respect to the horizontal plane of the substrate 10 (2° with respect to the normal line of the substrate), and the optical axis direction D of the optical compensating plate 80 is set to a direction inclined at an angle of 2° with respect to the normal line direction of the horizontal plane 80a of the optical compensating plate 80.

The optical compensating plate 80 can use one obtained by aligning the discotic liquid crystal to be tilt and then polymerizing it. FIG. 9 is a cross-sectional view schematically showing an example of the optical compensating plate. The optical compensating plate 80 of FIG. 9 is one obtained by proving an alignment film on a supporting body such as cellulose triacetate (TAC) and providing a discotic layer, such as triphenylene derivative, on the alignment film. When the discotic compound takes a liquid crystal phase, it shows negative uniaxis optically. In addition, alignment films 81a and 82a made of polyimide or the like are formed on surface of a pair of supporting bodies 81 and 82, the discotic compound 84 is applied on one supporting body, and a discotic layer 83 is interposed between the two supporting bodies. Then, a discotic nematic (ND) phase is formed by the heat treatment and is then polymerized by ultraviolet rays, and its alignment state is fixed. When the discotic nematic (ND) phase is formed, the discotic layer 83 is endowed with the tilt by the alignment films 81a and 82a, and is formed in a state in which its optical axis is obliquely inclined. The inclined angle θ of the optical axis 84a is controlled by an alignment process (rubbing process) of the alignment films 81a and 82a, so that the optical axis direction D and the pretilt direction P of the liquid crystal are parallel to each other.

Figure 10A:
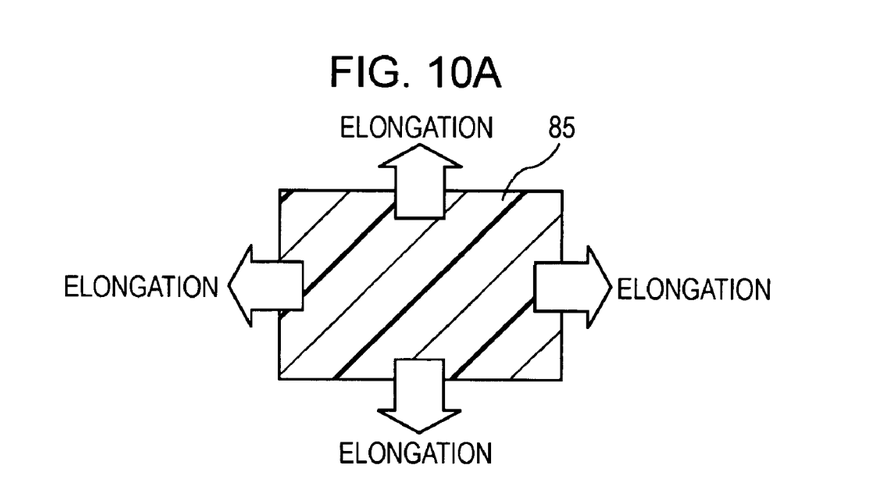
FIGS. 10A and 10B are diagrams showing one example of a method of manufacturing the optical compensating plate.
Figure 10B:
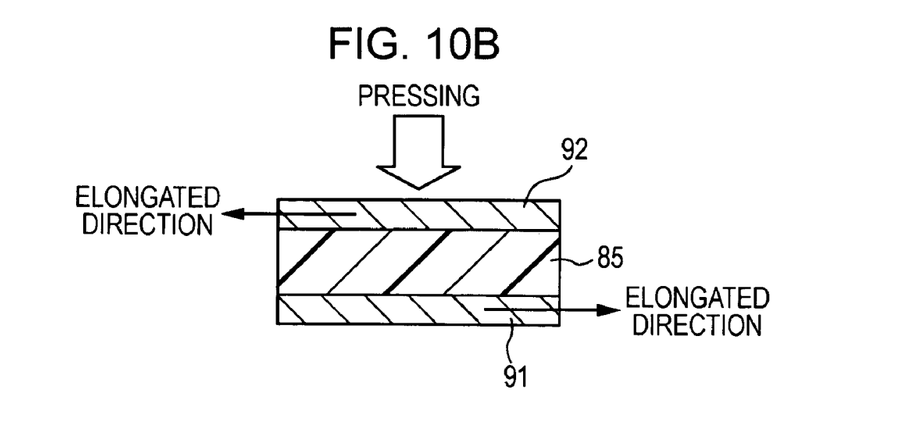

The above-mentioned optical compensating plate 80 can be also formed by applying the shearing stress on a polycarbonate or norbornene resin and elongating it. FIG. 10 is a diagram showing an example of a method of forming the optical compensating plate. In this method, as shown in FIG. 10A, a resin material 85 is heat up to substantially a glass transition point, and are elongated in two directions. In addition, the resin material 85 is interposed between the pair of heat substrates 91 and 92, and the substrates 91 and 92 are shifted in directions opposite to each other while putting pressure on the resin material 85 from the outside of one substrate. As a result, the shearing stresses of the directions opposite to each other are applied on the top and bottom surfaces of the resin material 85, so that an optical axis direction of an optical body constituting the resin material 85 is obliquely inclined. The inclined angle of the optical axis is controlled depending on the intensity of the shearing stress, so that the optical direction D and the pretilt direction P are parallel to each other.

Figure 11A:
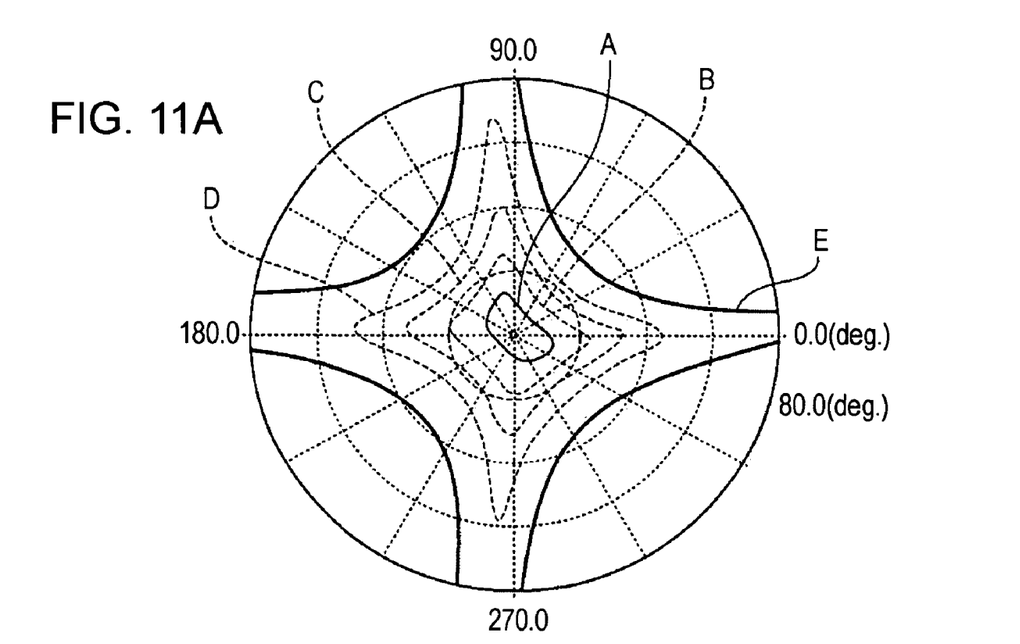
FIGS. 11A and 11B are diagrams of contrast curves when an optical axis of the optical compensating plate is inclined and when the optical axis of the optical compensating plate is not inclined, respectively.
Figure 11B:
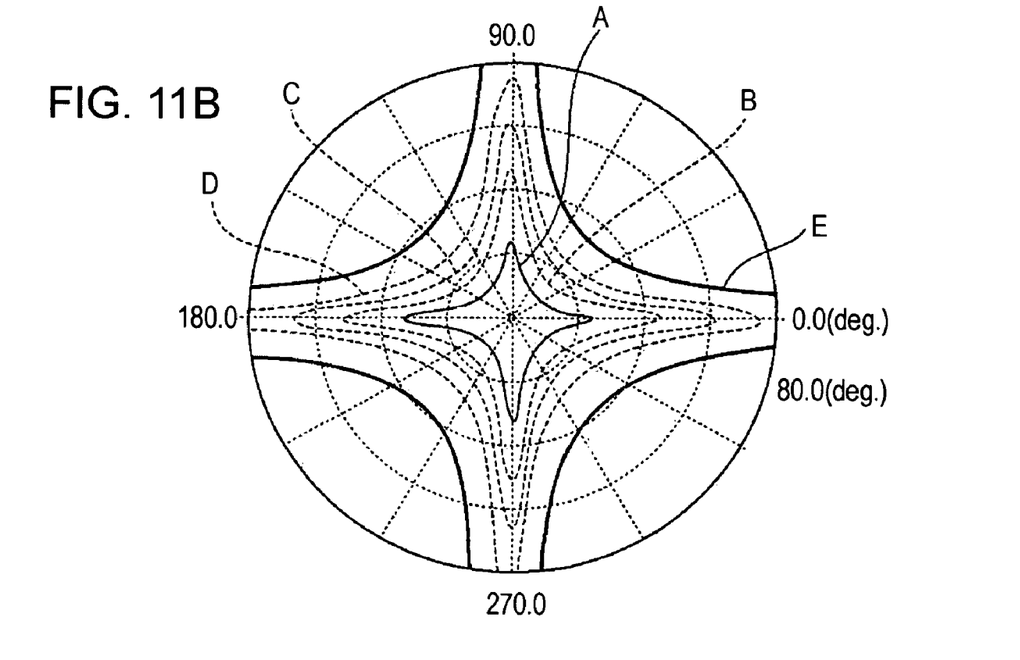

FIG. 11 is a diagram showing a measuring result of viewing angle characteristics. FIG. 11A is a diagram showing contrast curves when the optical axis of the optical compensating plate is not inclined (when the optical axis direction of the optical compensating plate and the pretilt direction of the liquid crystal does not align with each other), and FIG. 11B are a diagram showing contrast curves when the optical axis of the optical compensating plate is inclined at an angle of 2° in accordance with the pretilt angle of the liquid crystal, as in the present embodiment. In FIG. 11, a region shown by a sign A has the largest contrast, and regions shown by signs B, C, D, . . . have the contrast decreasing in this order. As shown in FIG. 11, in the case in which the optical axis direction of the optical compensating plate is inclined (FIG. 11A), display symmetry is high and a range for performing high contrast display is large as compared to the case in which the optical axis direction of the optical compensating plate is not inclined (FIG. 11B). For this reason, it can be apprehended that display having a wide viewing angle and a high contrast can be performed by aligning the optical axis direction D with the pretilt direction P.

As described above, also in the present embodiment, since the optical axis direction D of the optical compensating plate 80 is substantially parallel to the pretilt direction P of the liquid crystal, it is possible to entirely compensate for the phase difference due to the pretilt of the liquid crystal and the phase difference due to the light in an oblique direction, so that high contrast display can be achieved as compared to the related art.

Electronic Apparatus

Figure 12:
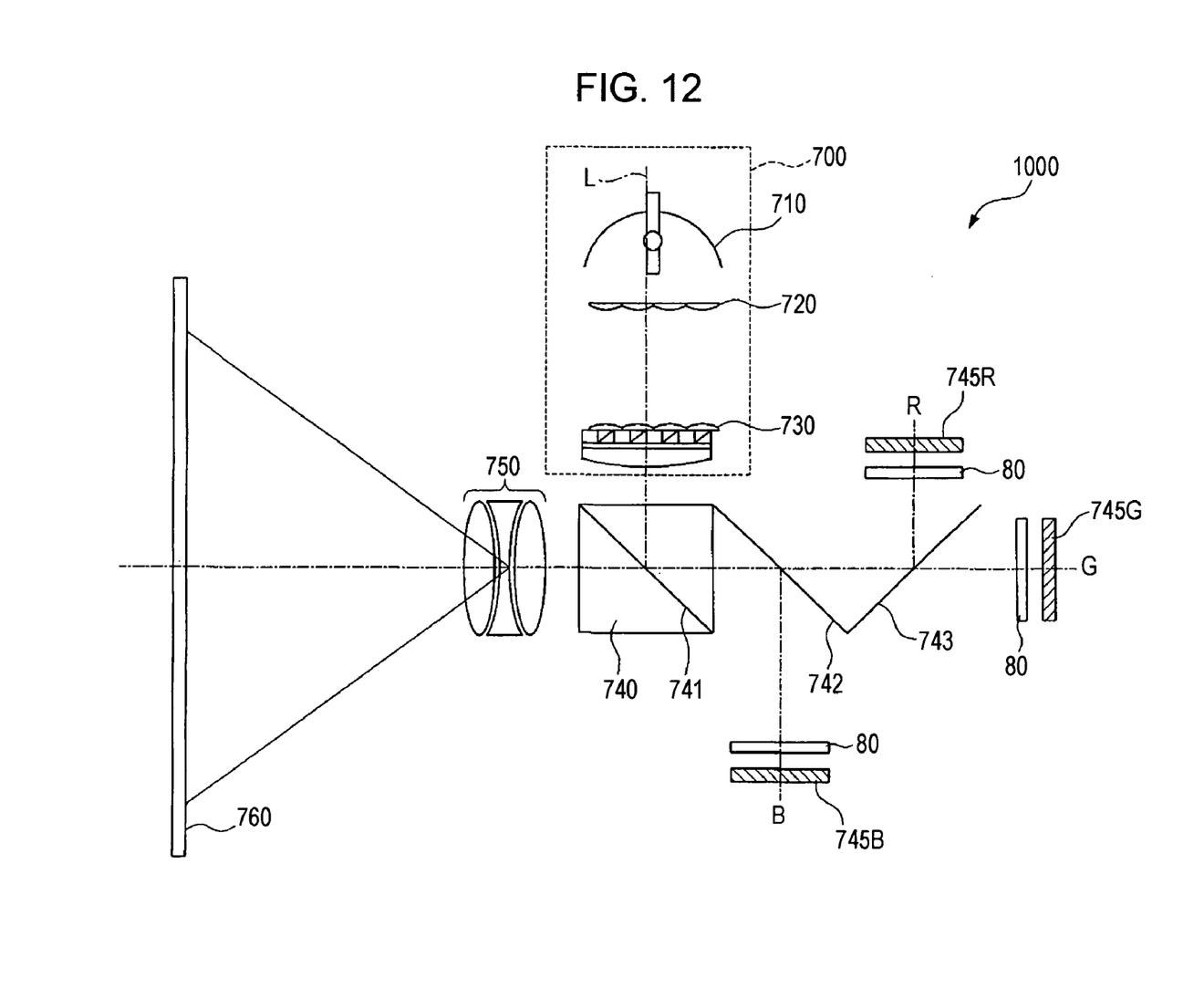
FIG. 12 is a diagram showing an example of a projection display device.

Next, a projection display device, which is an example of an electronic apparatus of the invention, will be described. FIG. 12 is a schematic diagram showing the structure of a three-plate-type reflective color liquid crystal projector, which is an example of the projection display device.

A liquid crystal projector 1000 includes a polarizing illumination device 700 mainly having a light source unit 710 disposed along a system optical axis L, an integrator lens 720 and a polarization conversion element 730, a polarized beam splitter 740 for reflecting an S polarized beam emitted from the polarizing illumination device 700 from an S polarized beam reflecting surface 741, a dichroic mirror 742 for separating a blue (B) light component from the light reflected from the S polarized beam reflecting surface 741 of the polarized beam splitter 740, a reflective liquid crystal light valve 745B for modulating the separated blue (B) light component, a dichroic mirror 743 for reflecting a red (R) light component, of the light after the blue light component is separated, to separate it, a reflective liquid crystal light valve 745R for modulating the separated red (R) light component, a reflective liquid crystal light valve 745G for modulating a green (G) light component of the residual light passing through the dichroic mirror 743, and a projection optical system 750 composed of projection lenses for synthesizing the light modulated by the three reflective liquid crystal light valves 745R, 745G, and 745B with the dichroic mirrors 743 and 742 and the polarized beam splitter 740 to project the synthesized light onto a screen 760.

The random polarized beam emitted from the light source unit 710 is divided into a plurality of intermediate beams by the integrator lens 720, is then converted into one kind of polarized beams (S polarized beam) arranged by the polarization conversion element 730 having a second integrator lens formed at the light incident side, and then reaches the polarized beam splitter 740. The S polarized beams emitted from the polarization conversion element 730 are reflected from the S polarized beam reflecting surface 741 of the polarized beam splitter 740, and a blue (B) beam in the reflected beams is reflected from a blue light reflecting layer of the dichroic mirror 742 and is then modulated by the reflective liquid crystal light valve 745B. In addition, in the light beams transmitting the blue light reflecting layer of the dichroic mirror 742, a red (R) beam is reflected from a red light reflecting layer of the dichroic mirror 743 and is then modulated by the reflective liquid crystal light valve 745R. On the other hand, a green (G) beam having transmitted the red light reflecting layer of the dichroic mirror 743 is modulated by the reflective liquid crystal light valve 745G. As described above, the color light beams are modulated by the reflective liquid crystal light valves 745R, 745G, and 745B.

Among the color light components reflected from the pixels of the liquid crystal panel, the S polarized light component does not transmit the polarized beam splitter 740 which reflect the S polarized light component therefrom, but the P polarized light component is transmitted through it. The light passing through the polarized beam splitter 740 forms an image.

Figure 13:
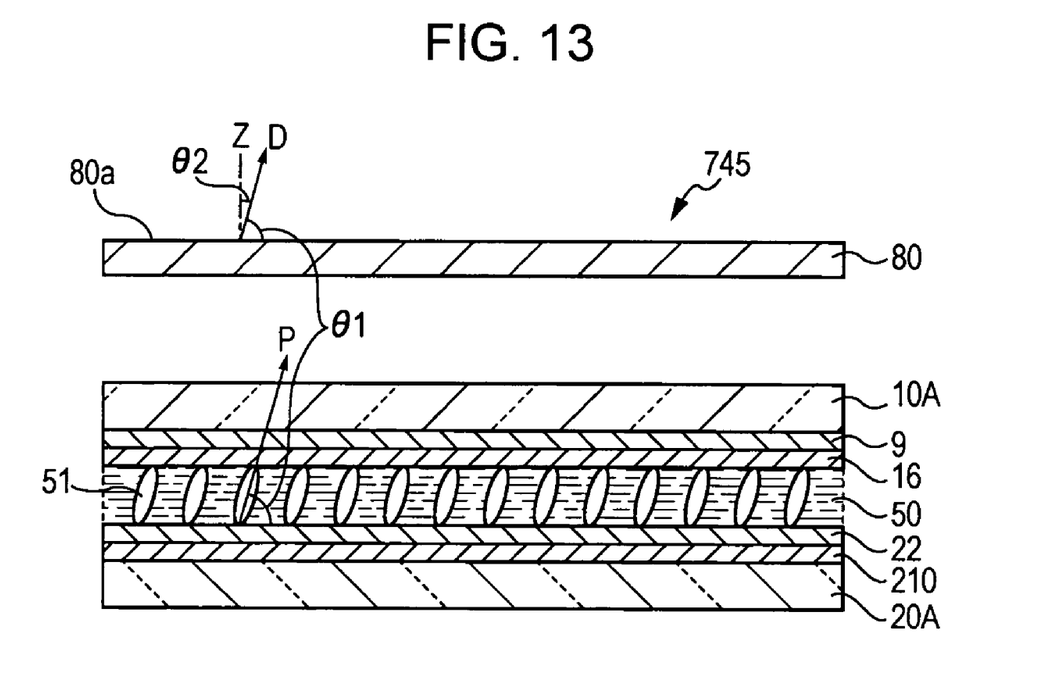
FIG. 13 is a cross-sectional view showing an example of liquid crystal device applied to the projection display device.

Here, the structure of the reflective liquid crystal light valves 745R, 745G, and 745B will be described with reference to FIG. 13. Since the three reflective liquid crystal light valves have the same structure, any one of three reflective liquid crystal light valves will be described as one reflective liquid crystal light valve 745. The reflective liquid crystal light valve (light modulating unit) 745 according to the present embodiment has a liquid crystal panel 60 with a liquid crystal layer interposed between a pair of substrates, and an optical compensating plate 80 disposed outside one substrate 10A of the liquid crystal panel 60, and is an active-matrix-type reflective liquid crystal device using a thin film transistor (hereinafter, referred to as a TFT) serving as a switching element. The basic configuration of the liquid crystal panel 60 is the same as those shown in FIGS. 1 to 3, except that the pixel electrode 9 is formed of a conductive material, such as aluminum (Al) or silver (Ag), having high reflectance, and the retardation of the liquid crystal layer 50 is half of that according to the first embodiment (that is, it is suitable for a reflective type). Therefore, its description will be omitted with respect to the structure of the liquid crystal panel 60.

The optical compensating plate 80 has the same configuration as that in the second embodiment. That is, the optical compensating plate 80 is composed of an optically anisotropic body, such as a discotic compound, having negative refractive index anisotropy and has a disc shape in the index ellipsoid, and the refractive index $n_z$ in an optical axis direction D is smaller than the refractive indices $n_x$ and $n_y$ in the other directions. The index ellipsoid is aligned so as to be inclined to the horizontal plane 80a of the optical compensating plate 80, and the optical-axis direction D of the optical compensating plate 80 (a minor-axis direction of the index ellipsoid) is inclined at an angle of $\theta1$ with respect to the normal line direction of the optical compensating plate 80. The inclined angle $\theta1$ of the optical axis is substantially equal to the pretilt angle of the liquid crystal 51, so that the optical axis direction D of the optical compensating plate 80 is substantially parallel to the pretilt direction P of the liquid crystal 51. In the present embodiment, the pretilt angle $\theta1$ of the liquid crystal 51 is set to 86° with respect to the horizontal plane of the substrate 10 (4° with respect to the normal line of the substrate), and the optical axis direction D of the optical compensating plate 80 is set to a direction inclined at an angle of 4° with respect to the normal line direction of the horizontal plane 80a of the optical compensating plate 80.

As described above, since in the light valve 745 according to the present embodiment, the optical axis direction D of the optical compensating plate 80 is substantially parallel to the pretilt direction P of the liquid crystal, it is possible to entirely compensate for the phase difference due to the pretilt of the liquid crystal and the phase difference due to the light in a inclined direction. Therefore, in the liquid crystal projector 1000 according to the present embodiment, it is possible to achieve image display having a wider viewing angle and higher contrast than those in the related art.

In the present embodiment, the reflective liquid crystal display device is exemplified as the projection display device. However, the invention is not limited thereto, but may be applied to a transmissive liquid crystal projector. In this case, it is necessary to use the transmissive liquid crystal device according to the first or second embodiment as a light modulating unit. In addition, according to the present embodiment, the transmissive display device having the liquid crystal device is exemplified as an example of the electronic apparatus. However, the liquid crystal of the invention is not limited to the transmissive display device, and may be mounted on various electronic apparatuses. Examples of the electronic apparatus may include apparatuses having an electronic book, a personal computer, a digital still camera, a liquid crystal television, a view-finder-type or monitor-direct-view type video tape recorder, a car navigation device, a pager, an electronic organizer, a electronic calculator, a word processor, a work station, a video phone, a POS terminal, and a touch panel, and the liquid crystal device can be properly used as an optical modulating unit of them.

As described above, the preferred embodiments according to the invention has been described with reference to the accompanying drawings, but it goes without saying that the invention is limited thereto. The shapes or combinations of the respective constituent elements shown in the drawings are only exemplary, but various changes and modifications can be made based on the design requirement without departing from the spirit and scope of the invention.

What is claimed is:

1. A liquid crystal device comprising:
    a liquid crystal panel including a pair of substrates; and
    a liquid crystal layer interposed between the pair of substrates, the liquid crystal layer including liquid crystal having negative dielectric anisotropy and a predetermined pretilt direction; and
    an optical compensating plate provided outside at least one of the pair of substrates, the optical compensating plate being disposed substantially parallel to one of the pair of substrates, the optical compensating plate having negative refractive index anisotropy and an optical axis direction, the optical axis direction of the optical compensating plate being substantially parallel to the pretilt direction of the liquid crystal at an angle deviating from a line substantially normal to the optical compensating plate, wherein a thickness direction phase difference of the optical compensating plate is smaller than a retardation of the liquid crystal panel.

2. A projection display device comprising the liquid crystal device according to claim 1 as an optical modulating unit.

3. The liquid crystal device according to claim 1, wherein the optical axis direction of the optical compensating plate is formed by applying shearing stress on a polycarbonate or norbornene resin and elongating it.

* * * * *